United States Patent [19]
Hiltunen et al.

[11] Patent Number: 5,380,507
[45] Date of Patent: Jan. 10, 1995

[54] METHOD OF TREATING PROCESS OR FLUE GASES CONTAINING HALOGENOUS COMPOUNDS

[75] Inventors: Matti Hiltunen, Karhula; Kurt Westerlund, Helsinki, both of Finland

[73] Assignee: A. Ahlstrom Corporation, Noormarkku, Finland

[21] Appl. No.: 915,579

[22] Filed: Jul. 20, 1992

[30] Foreign Application Priority Data

Aug. 9, 1991 [FI] Finland .................................. 913776

[51] Int. Cl.6 .................................................. C01B 7/00
[52] U.S. Cl. ................................. 423/240 S; 588/206
[58] Field of Search ..................... 423/240 S; 588/206, 588/207, 209, 213, 214, 900, 205; 110/245

[56] References Cited

U.S. PATENT DOCUMENTS

| | | | |
|---|---|---|---|
| 4,080,910 | 3/1978 | Jaccoud | 110/210 |
| 4,215,095 | 7/1980 | Harris et al. | 588/213 |
| 4,485,081 | 11/1984 | Magistro | 423/240 S |
| 4,616,576 | 10/1986 | Engström et al. | 110/245 |
| 4,651,807 | 3/1987 | Newby | 165/104.16 |
| 4,654,203 | 3/1987 | Maurer et al. | 423/240 S |
| 5,086,715 | 2/1992 | Bürgin et al. | 110/342 |

FOREIGN PATENT DOCUMENTS

| | | | |
|---|---|---|---|
| 301272A | 2/1989 | European Pat. Off. | 423/240 S |
| 3527615A1 | 2/1987 | Germany | 423/240 S |
| 51-011065 | 1/1976 | Japan | 423/240 S |

*Primary Examiner*—Benjamin R. Fuller
*Assistant Examiner*—Valerie Lund
*Attorney, Agent, or Firm*—Nixon & Vanderhye

[57] ABSTRACT

A method of cooling hot flue or process gases containing halogenous compounds in two successively located circulating fluidized bed reactors. In the first reactor the gases are cooled to a temperature of >400° C. In the second reactor the gases are rapidly cooled to below a temperature zone of 250°–400° C. In the first reactor the gases are brought into contact with a catalytic material capable of destroying polyhalogenous compounds. A retention time of 1–10 seconds, preferably 2–5 seconds, is provided for the gases in the first reactor.

20 Claims, 1 Drawing Sheet

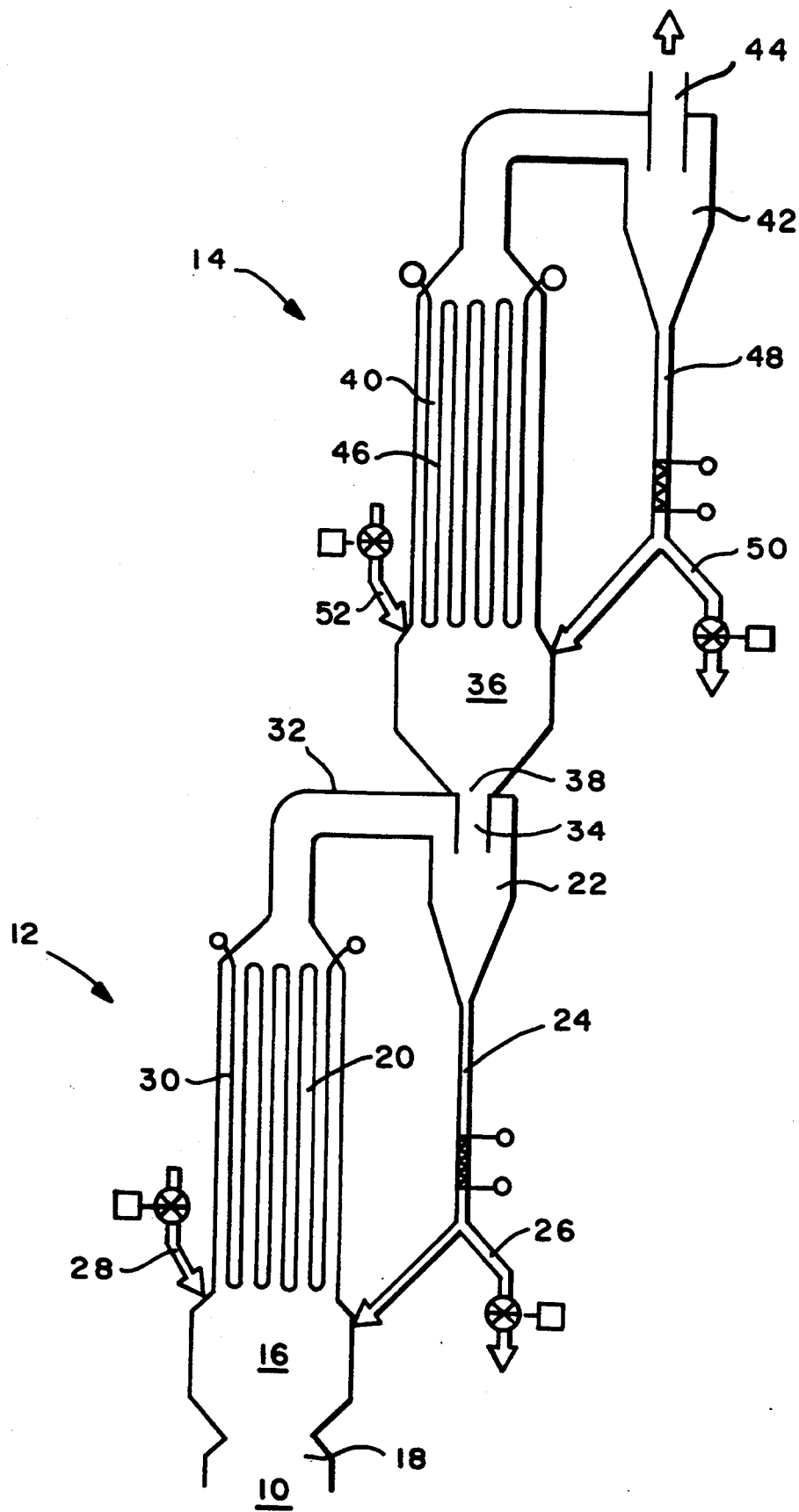

METHOD OF TREATING PROCESS OR FLUE GASES CONTAINING HALOGENOUS COMPOUNDS

BACKGROUND AND SUMMARY OF THE INVENTION

The present invention relates to a method of cooling flue or process gases containing halogenous compounds in two successively located circulating fluidized bed reactors, which is a variation of that shown in co-pending U.S. application Ser. No. 07/776,403 filed Nov. 22, 1991. The method herein provides cooling in the first circulating fluidized bed reactor hot gases to a temperature of >400° C. Further, the method provides quickly cooling the hot gases in the second circulating fluidized bed reactor to a temperature below 250° C.

The present invention relates especially to a method of cooling flue or process gases resulting from treatment of materials containing chlorine or halogenized hydrocarbons. These materials may comprise waste, biological sludge, metal concentrates, scrap metal., and slag, from, e.g., copper smelters. Further, the method is capable of minimizing environmentally harmful emissions.

The formation of chlorine-containing environmental poisons resulting from incineration of municipal waste, combustion of biological sludges, and smelting processes has been recognized as a significant problem. It has been found that polychlorinated aromatic compounds categorized as super-poisons, such as coplanar PCB, polychlorinated dioxins, and polychlorinated furans, are produced to a great extent in both municipal waste incinerator plants and industrial combustion plants for biological waste. Also, dioxins have been found in flue gases from metal smelters. These chlorine-containing compounds are super-poisonous for human beings and animals, capable of bringing about genetic damage. Further, these compounds are also carcinogenic. The environment is polluted by these toxic compounds by their attachment to flue dust.

It has been found that the lower the temperature and the shorter the retention time, the greater the amount of resulting super-poisons. Further, it has been found that combustion at 500°-700° C. is especially favorable for the formation of polychlorinated dioxins and furans. This has led to the conclusion that the combustion should be carried out at a higher temperature and with a longer retention time in order to decompose the super-toxins. However, it has also been suggested that the wastes could be safely destroyed by incinerating them at relatively low temperatures if the flue gases are post-combusted at such a high temperature that, for example, dioxin and furan toxins decompose.

It is, nevertheless, not always possible to maintain a temperature suitable for decomposing the super-toxins in the actual process or in post-combustion. It has additionally been found that the super-toxins are easily re-formed in the later stages of the process, and also after post-combustion.

Dioxins are formed by synthetization from chlorine compounds in the presence of coal, water and oxygen at favorable temperatures. The temperature in which flue gases exist is one example. It has been established that a large amount of the dioxins located in the fly ash are formed only after combustion in heat exchangers and the stack. The formation is caused by a means of a so-called "de novo synthesis". This is because the "de novo synthesis" of the dioxins is to a great extent dependent on the temperature, and the temperature of 250° to 400° C. is especially suitable for this type of synthesis. Efforts have been made, by as complete a combustion as possible, by a high combustion temperature, and by a long retention time, to produce fly ash containing as little carbon as possible, whereby the synthesis would be prevented. By separating metals from the wastes, it has also been attempted to decrease the amount of polychlorinated aromats in the flue gases.

U.S. Pat. No. 4,762,074 suggests the combustion of wastes containing prestages of toxic dioxins and furans by means of oxygenated air at a high temperature, at least 1200° C., for decomposing the toxins. By using a highly excessive amount of oxygen, it is also attempted to maintain the amount of the nitrogen oxides, which increase at high temperatures, at an acceptable level.

Swedish patent specification 453,777 discloses a method of combusting solid waste in a reactor in a bubbling fluidized bed at a temperature below 900° C. In the reactor, above the actual fluidized bed, the temperature of the flue gases is raised to at least 950° C. by adding secondary air and insulating the reactor walls. The temperature of the flue gases is maintained at the level above 950° C. for as long as required for the hydrocarbons and dioxins to become decomposed, by conducting the flue gases through an uncooled gas duct. The gases are cooled prior to the heat exchangers by injecting air or flue gases into the gases.

U.S. Pat. No. 4,794,871 discloses a method, comprising two or three stages, in which waste is first treated in a rotary drum at a temperature of at most 500° C. and the solid waste formed thereby is then treated at a temperature of at least 500° C., preferably at 500 to 1000° C., for destroying the toxic substances. The flue gases from both stages are combined and combusted at such a high temperature that the toxic compounds of the gases are completely decomposed.

Swedish patent application 8406090-4 discloses a method in which wastes harmful to the environment and containing chlorinated hydrocarbons are incinerated substoichiometrically at a temperature of at least 1200° C. The combustion is effected as plasma incineration. According to the patent application, re-formation of toxic compounds is prevented by bringing the flue gases that have been cooled to a temperature of 350° to 700° C., into contact with lime for separating chlorine from the gases. Chlorine separation is preferably effected by conducting the gases through a vertical reactor filled with lime. At low temperatures, however, polychlorinated aromats are produced quickly before the chlorine has become bound to lime. Thus, the method does not lead to a desirable result.

U.S. Pat. No. 4,938,366, among others, suggests decomposing the toxic polyhalogens in a two-stage catalytic treatment. In the method the gases are first directed through an oxidizing catalytic cracking stage and then directed through a catalytic post-combustion stage.

An object of the present invention is to provide a simple method of minimizing the emissions of polyhalogenated hydrocarbon compounds in plants forming hot process or flue gases.

Characteristic features of the method according to the invention are: first—the process or flue gases, the temperature of which is >700° C., are introduced as fluidizing gas to the first circulating fluidized bed reactor and cooled therein to 400°-700° C.; second—the retention time of the gases in the first circulating fluidized bed reactor is about 1-10 seconds; and third—in the first circulating fluidized bed reactor the gases are brought into contact with a catalytic material capable of decomposing polyhalogen compounds.

Preferably the retention time of the gases in the first circulating fluidized bed reactor at a temperature of 400°-700° C. is 2-5 seconds. In this amount of time the catalytic material effects a complete decomposition of the dioxins and furans contained in the gas.

Preferably the catalyst is a metal powder. The metal powder may be Zn, Cu, Ni, Cr, Fe, Al, Pb, other metal or alloy. Also, the catalyst may be a metal oxide, such as ZnO, NiO, $Cr_2O_3$, FeO, $Fe_3O_4$, PbO, CaO, MgO, other metal oxides or mixtures thereof. Further, the catalyst may comprise a metal salt, such as $Na_2CO_3$, $K_2CO_3$, or $CaCO_3$. Preferably, the catalytic material consists of a catalytically active metal, metal oxide or metal salt dust, which is entrained with the process gas and allowed to form at least partly the bed material of the circulating fluidized bed reactor. The circulating fluidized bed reactor can be located, for example, after the shaft furnace of a scrap copper smelter. The flue gases from the furnace contain the contaminants contained in the scrap material, for example ZnO, PbO, SnO etc. These contaminants are separated in the dust separator of the circulating fluidized bed reactor to remain as bed material and act thus as catalysts to decompose organic chlorine compounds.

In a circulating fluidized bed reactor the hot gases conducted therein as fluidizing gas are very quickly cooled when they are mixed with the circulating bed particles colder than the gas. Usually the rate of cooling in the mixing chamber is >500° C./s, preferably more than 1000° C./s.

According to an embodiment of the invention, the cooling installation has been connected to the radiation chamber of a waste heat boiler of a metal smelter. The gases are exhausted at a temperature of about 700°-1200° C. from the radiation chamber and are then directed as fluidizing gas to the first circulating fluidized bed reactor, wherein the gases are cooled to 400°-700° C. The bed material is at least partly formed by metal oxide, e.g., zinc oxide, which acts as a catalyst in the decomposing reaction of the dioxins and furans. The retention time of the gases in the reactor is preferably 2-5 seconds. If necessary, ash-containing bed material can be removed from the circulating fluidized bed reactor. New catalyst-containing bed material is introduced into the reactor either by adding some of it, as needed, or by allowing at least some of the metal oxide dust contained in the flue gases to remain as bed material.

From the first circulating fluidized bed reactor the gas, from which the catalyst has been separated, is introduced into the second circulating fluidized bed reactor, in which the final cooling of the gas is effected. When the gases are exhausted from the first reactor, they are in a temperature range of about 400°-700° C. These gases are rapidly cooled in the second reactor past the temperature area of 250°-400° C. This temperature area is where the "de novo" synthesis of dioxins and furans takes place, and this is desirable to reduce the temperature to below 250° C. as quickly as possible. The rate of cooling is >500° C./s, preferably >1000° C./s. Thus, the gases are cooled almost immediately to a temperature of below 250° C. upon entering the mixing chamber of the second reactor. In the second circulating fluidized bed reactor the gases can be cooled to 180° C., or even below that, if needed, after which the gases can be conducted to a bag filter, or other similar member, for final cleaning.

By cooling the gases rapidly past the temperature area most suitable for dioxin synthesis, or similar synthesis, at 250°-600° C., the formation of these polyhalogenous aromatic compounds is minimized. Further, substances that either react with the chlorine, fluorine and sulphur compounds, or absorb these compounds, can be added to the circulating bed material of either the first or the second reactor to remove these compounds from the gases. At the same time a considerable part of the heavy metals and their compounds that are contained in the flue gases and that melt and vaporize at a low temperature, such as Hg, As, Zn, Cd, Pb and Sn, can be separated from the gases by condensating them into the circulating bed material in the cooling reactors. Particles can be removed from the circulation of the cooling reactor either continuously or intermittently for removing harmful or recoverable substances from the circulation. New particles are accordingly added to maintain the circulating material needed for the gas cooling process.

BRIEF DESCRIPTION OF THE DRAWING

The invention is described in closer detail by way of reference to the accompanying drawing, which schematically illustrates a system for practicing the method according to the invention.

DETAILED DESCRIPTION OF THE DRAWING

The figure illustrates a two-stage gas cooling installation connected to the radiation chamber 10 of a waste heat boiler of a metal smelter. The cooling installation comprising a first circulating fluidized bed reactor 12 and a second circulating fluidized bed reactor 14.

The first reactor 12 has a mixing chamber 16 connected at its lower portion to a gas outlet 18 of the radiation chamber 10. Process gases flow through the gas outlet 18 into the mixing chamber 16 as fluidizing gas. Bed material from the first fluidized bed reactor 12 contains at least some metal oxide-containing catalytic material particles capable of acting as a catalyst in the decomposition reaction of dioxins and furans.

Dioxins and furans are destroyed catalytically on the metal oxide surfaces in chamber 16 at a temperature of about 400°-700° C. during a retention time of about 1-4 seconds. According to the invention, the temperature of the gas is lowered in the first circulating fluidized bed reactor 12 to 400°-700° C., and the gas is held there for a period of about 1-10 seconds, preferably about 2-5 seconds. This lowering of the temperature enables the use of the catalyzing effect.

From the mixing chamber 16 the gases flow through a free board area 20 to a particle separator 22. The bed material particles are separated from the gas in the particle separator 22. The separated particles are conducted back to the mixing chamber 16 via a recycling duct 24. A portion of the separated particles can be removed from the recycling duct 24 circulation by a second duct 26. This second duct enables the removal and disposal of a portion of used catalyst or particles that were separated from the gas by the recycling duct 24. New catalytic material can be added via duct 28. The circulating bed material is cooled by heat transfer surfaces 30 provided at the free board area 20.

Preferably the catalytic material particles are small enough to flow with the gas to an upper portion of the free board area 20, and from area 20 to the particle separator 22 via duct 32; but nonetheless, coarse enough to be separated in the particle separator 22.

The gas outlet duct 34 from the particle separator 22 is arranged to communicate with an inlet 38 of the mixing chamber 36 of a second circulating fluidized bed reactor 14. The gases flow as fluidizing gas into the mixing chamber 36 of the second reactor 14. The gases that flow are now free of toxic polyhalogenous compounds because of the purifying effect of the catalyst in the first reactor 12. These gases are rapidly cooled by the additional circulating material located in the second bed reactor to below a temperature zone suitable for "de novo" synthesis, e.g. below 250° C.

The gases flow from the mixing chamber 36 through a second free board area 40 to a second particle separator 42. The gases are then separated from the additional particles by the second particle separator 42. The gases then flow through outlet In the second free board area 40 the gases and particles are cooled by heat transfer surfaces 46. A major portion of these separated particles are recycled to the mixing chamber 36 of the second bed reactor through recycling duct 48. A further portion of these separated particles located in duct 48 can, when needed, be removed from circulation via conduit 50. This further portion of the separated particles can be directed to the first reactor 12 (e.g. to inlet 28), or to the main process to be combusted. New circulating bed material can be added via duct 52.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and processes.

What is claimed is:

1. A method of cooling hot gas containing halogenous compounds utilizing first and second successive circulating fluidized bed reactors, each having a fluidizing gas inlet and an exhaust gas outlet, and fluidized particles, comprising the steps of:
   (a) feeding as fluidizing gas to the first fluidized bed reactor gases, containing halogenous compounds, at a temperature of greater than about 700° C.;
   (b) providing catalytic material as at least part of the fluidized particles in the first fluidized bed reactor;
   (c) cooling the fluidizing gas to about 400°–700° C. and, retaining the halogenous compounds in the first fluidized bed reactor for about 1–10 seconds while effecting catalytic destruction of the halogenous compounds, and then discharging the gas from the first fluidized bed reactor through the exhaust gas outlet thereof;
   (d) feeding the gas discharged from the first fluidized bed reactor into the second fluidized bed reactor as fluidizing gas therein; and
   (e) quickly cooling the fluidizing gas in the second fluidized bed reactor to a temperature of below about 250° C., and then discharging the gas from the second fluidized bed reactor through the exhaust gas outlet thereof.

2. A method as recited in claim 1, wherein step (c) is practiced to retain the halogenous compounds in the first circulating fluidized bed reactor about 2–5 seconds.

3. A method as recited in claim 1 wherein step (b) is practiced so as to provide metal oxides as the catalytic material.

4. A method as recited in claim 1 wherein step (b) is practiced to provide as the catalytic material a material selected from zinc oxide, lead oxide, iron oxide, copper oxide, nickel oxide, aluminum oxide, silicon oxide, or mixtures thereof.

5. A method as recited in claim 1 wherein step (e) is practiced to effect cooling in the second circulating fluidized bed reactor at a rate of >500° C./s, and wherein steps (a)–(e) are practiced in two circulating fluidized beds.

6. A method as recited in claim 1 wherein step (b) is practiced to provide a metal salt as at least a portion of the catalytic material in the first fluidized bed reactor.

7. A method as recited in claim 1 wherein step (b) is practiced to provide metal powder as at least a portion of the catalytic material in the first fluidized bed reactor.

8. A method as recited in claim 1 wherein step (e) is practiced to effect cooling in the second circulating fluidized bed reactor at a rate of >1000° C./s.

9. A method as recited in claim 1 comprising the further step of removing particles from the second fluidizing bed reactor exhaust gas, and recirculating the removed particles to the first fluidizing bed reactor.

10. A method as recited in claim 1 wherein step (a) is practiced by feeding gases from a heat recovery boiler of a metal smelter as fluidizing gas for the first circulating fluidized bed reactor.

11. A method of effectively cooling hot gases containing environmentally harmful cyclic chained halogen containing compounds, such as dioxins and furans, comprising the steps of:
   (a) intimately mixing the hot gases with relatively cool fluidized particles containing catalytic material;
   (b) effecting complete catalytic destruction of the halogen containing compounds by maintaining said compounds a sufficient time period at a temperature of about 400°–700° C. in contact with the fluidized particles containing catalytic material, and producing an exhaust gas containing destroyed halogen containing compounds; and then
   (c) quickly cooling the exhaust gas to a temperature of below about 250° C., to prevent de novo synthesis of dioxins and furans.

12. A method as recited in claim 11 wherein step (c) is practiced to effect cooling at a rate of >500° C./s.

13. A method as recited in claim 11 wherein step (a) is practiced by providing metal oxide particles as the catalytic material.

14. A method as recited in claim 11 wherein step (a) is practiced by providing metal salt particles as the catalytic material.

15. A method as recited in claim 11 wherein step (a) is practiced by providing metal powder particles as the catalytic material.

16. A method as recited in claim 11 wherein step (c) is practiced to effect cooling at a rate of >1000° C./s.

17. A method as recited in claim 16 wherein step (c) is practiced by bringing the exhaust gases into contact with relatively cool fluidized particles in a circulating fluidized bed.

18. A method as recited in claim 11 wherein step (b) is practiced by maintaining the halogen containing compounds in contact with the catalytic material particles about 1–10 seconds.

19. A method as recited in claim 11 wherein step (b) is practiced by maintaining the halogen containing compounds in contact with the catalytic material particles about 2–5 seconds.

20. A method as recited in claim 12 wherein step (c) is practiced by bringing the exhaust gases into contact with relatively cool fluidized particles in a circulating fluidized bed.

* * * * *